United States Patent [19]

Seto

[11] Patent Number: 4,663,671
[45] Date of Patent: May 5, 1987

[54] FACSIMILE APPARATUS

[75] Inventor: Toshio Seto, Zama, Japan

[73] Assignee: Ricoh Company, Ltd., Tokyo, Japan

[21] Appl. No.: 691,890

[22] Filed: Jan. 16, 1985

[30] Foreign Application Priority Data

Jan. 20, 1984 [JP] Japan .............................. 59-5191[U]

[51] Int. Cl.$^4$ ............................................ H04M 1/40
[52] U.S. Cl. .................................. 358/260; 358/257; 358/285
[58] Field of Search ............... 358/260, 256, 257, 285; 328/154, 137, 116; 371/68; 340/661

[56] References Cited
U.S. PATENT DOCUMENTS 4,325,086  4/1982  Sato et al. ........................ 358/285

Primary Examiner—Edward L. Coles, Sr.
Attorney, Agent, or Firm—Oblon, Fisher, Spivak, McClelland & Maier

[57] ABSTRACT

A facsimile apparatus capable of saving time necessary for the transmission of video data. Pixel signals provided by scanning a document in both the lengthwise and widthwise directions are digitized, then encoded, and then stored in independent buffer memories. One of the buffer memories storing a smaller amount of video data than the other is chosen to transmit its video data to a remote station over a line.

6 Claims, 3 Drawing Figures

FACSIMILE APPARATUS

BACKGROUND OF THE INVENTION

The present invention relates to a facsimile apparatus which achieves a considerable transmission rate by transmitting selected one of video data associated with a document which has been provided by scanning the document in a particular direction higher in compression ratio than the other direction or directions.

Traditionally, in a transmission mode operation of a facsimile apparatus, images on a document are scanned with a shorter dimension, or widthwise direction, of the document defining a main scan direction and a longer dimension, or longitudinal direction, defining a subscan direction, so that a video signal continuous along each main scanning line is transmitted after code compression. Documents are sometimes ruled parallel to the lengthwise direction thereof, that is, recorded with many patterns which are rather continuous in the lengthwise direction that in the widthwise direction. A code compression ratio attainable with such a kind of documents is not very large because a black pixel with a short run-length appears frequently in a video signal associated with each main scan line. Stated another way, it is rather favorable from the higher compression ratio standpoint to code compress a video signal which is continuous in a direction parallel to the lengthwise direction.

However, a prior art facsimile apparatus is designed to code compress video signals solely in the main scan direction, i.e. widthwise direction of a document, so that the attainable compression ratio is limited when it comes to transmission of a document carrying a lot of lengthwisely continous patterns. The limited compression ratio is reflected by greater time consumption for video data transmission.

SUMMARY OF THE INVENTION

It is therefore an object of the present invention to provide a facsimile apparatus which saves a time require for video data transmission and, thereby, enhances cost-effect transmission.

It is another object of the present invention to provide a generally improved facsimile apparatus.

A facsimile apparatus of the present invention comprises a video signal selector for sequentially selecting, with respect to at least two different directions on a document, video signals produced by digitizing pixel signals which represent images on the document decomposed into pixels, an encoder for encoding the digitized video signals output from the video signal selector by a predetermined system to produce encoded signals, at least two buffer memories for individually storing the encoded signals output from the encoder while holding the encoded signals each in correspondence with one of the different directions, a decision circuit for producing a decision signal by discriminating one of the buffer memories which stores the smallest amount of data, a memory selector for selecting one of the buffer memories in response to the decision signal output from the decision circuit and delivering the video data stored in the selected buffer memory, and a communication control unit for informing a facsimile apparatus at a remote station of a particular direction with which the video signals are associated before transmitting the video data which are output from the memory selector.

In accordance with the present invention, a facsimile apparatus capable of saving time necessary for the transmission of video data is disclosed. Pixel signals provided by scanning a document in both the lengthwise and widthwise directions are digitized, then encoded, and then stored in independent buffer memories. One of the buffer memories storing a smaller amount of video data than the other is chosen to transmit its video data to a remote station over a line.

The above and other objects, features and advantages of the present invention will become apparent from the following detailed description taken with the accompanying drawings.

DESCRIPTION OF THE PREFERRED EMBODIMENTS

While the facsimile apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
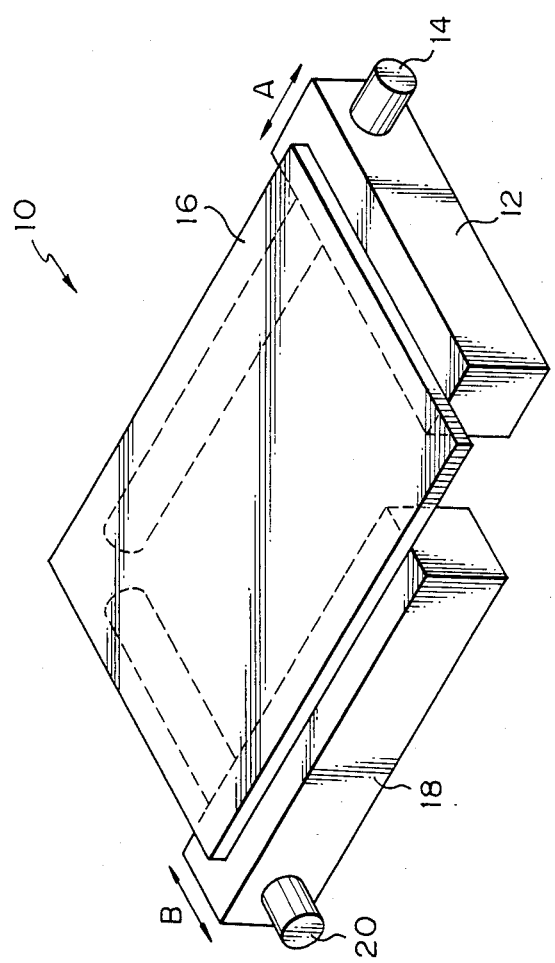
FIG. 1 is a perspective view of a reading arrangement which forms part of a facsimile apparatus embodying the present invention.

Referring to FIG. 1 of the drawings, a reader arrangement of a facsimile apparatus embodying the present invention is shown and generally designated by the reference numeral 10. The reader 10 comprises a carriage 12 movable on and along a guide rod 14 which extends parallel to a longer dimension, or lengthwise direction as will be referred to, A of a document which is laid on a glass platen 16. It also comprises a carriage 18 movable on and along a guide rod 20 which extends parallel to a shorter dimension, or widthwise direction, B of the document. The carriage 12 includes a so-called 1-magnification scanner (not shown) made up of a line image sensor (simply referred to as a sensor hereinafter) S1 arranged parallel to the widthwise direction B, a light source, etc. The movable body 18, on the other hand, includes a 1-magnification scanner (not shown) made up of a sensor S2 extending parallel to the lengthwise direction A, a light source, etc. In this construction, the sensor S1 provides video signals each being continuous in the direction B, while the sensor S2 provides video signals each being continuous in the direction A.

Figure 2:
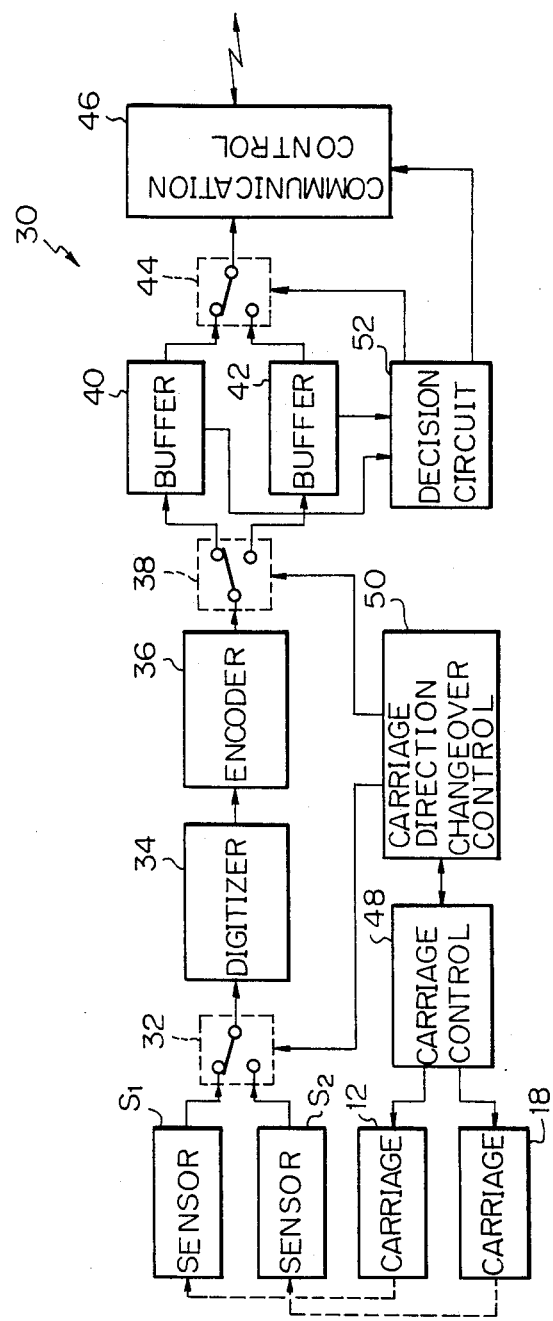
FIG. 2 is a block diagram of a signal processing and control system associated with the reading arrangement shown in FIG. 1.

Referring to FIG. 2, a signal processing and control system 30 is shown which is associated with the reading system 10 of FIG. 1. As shown, the system 30 comprises a switch 32 for selecting one of the outputs of the sensors S1 and S2, a digitizer 34 for digitizing an output of the switch 32 using a predetermined threshold value, an encoder 36 for encoding an output of the digitizer 34 by a predetermined system, a switch 38 for branching an output of the encoder 36, buffer memories 40 and 42 each for storing signals routed thereon from the switch 38, a switch 44 for selecting one of outputs of the buffer memories 40 and 42, and a communication control unit 46 for performing a predetermined facsimile transmission control with a network control circuit included therein. The system 30 further comprises a carriage control 48 for drivably and exclusively controlling the drive of the carriages 12 and 18, a scanning direction changeover control 50, and a decision circuit 52 for comparing the buffer memories 40 and 42 to determine which one of them has stored a smaller amount of data, for causing the switch 44 to select one of the buffer memories 40 and 42 which is smaller in the amount of stored data, and for informing the communication control unit 46 of a scanning direction with which that particular buffer memory is associated.

As the operator lays a document on the glass platen 16, then enters a telephone number assigned to a desired remote station through an operator panel (not shown), and then turns on a start key of the apparatus, data indicative of the telephone number is stored in the communication control 46. The scanning direction changeover control 50 positions the switches 32 and 38 as illustrated and, at the same time, applies an instruction to the carriage control 48 for activating the carriage 12. Then, the carriage 12 starts its stroke so that a signal output from the sensor S1 is selected by the switch 32. The signal from the switch 32 is digitized by the digitizer 34, then code compressed by the encoder 36, and then stored in the buffer memory 40 via the switch 38. Consequently, a continuous video signal selected in the transverse direction B of the document is encoded and stored in the buffer memory 40.

As soon as the carriage 12 completes its stroke in the direction A, the carriage control 48 notifies it to the scanning direction changeover control 50. Then, the control 50 shifts the switches 32 and 38 to positions opposite to the illustrated at a predetermined timing and, thereupon, delivers an instruction to the carriage control 48 so as to activate the other carriage 18. As the carriage 18 starts its stroke in the direction B, a signal output from the sensor S2 is selected by the switch 32, then digitized by the digitizer 34, then code compressed by the encoder 36, and then stored in the buffer memory 42 via the switch 38. This allows a signal continuous in the direction A of the document to be encoded and stored in the buffer memory 42.

The decision circuit 52 then sees an amount of data stored in the buffer 40 and that stored in the buffer 42. This may be accomplished in terms of the addresses of write pointers associated with the respective buffers, for example. If the data amount stored in the buffer 40 is less than that stored in the buffer 42, the decision circuit 52 controls the switch 44 to the illustrated position and informs the communication control 46 of the fact that the transmission video data is associated with a video signal which is continuous in the widthwise direction B. Conversely, if the the buffer 42 is less in stored data amount than the buffer 42, the decision circuit 52 controls the switch 44 to the other position while informing the communication control 46 of the fact that the transmission video data is associated with a video signal which is continous in the lengthwise direction A.

Supplied with such information concerning the video data from the decision circuit 52, the communication control 46 originates a call to the desired remote station (not shown) based on the stored telephone number, thereby setting up a line. Then, by a pretransmission procedure, the communication control 46 notifies the remote station whether the video data to be received is associated with a video signal continuous in the widthwise direction B or the lengthwise direction A of the document. After sending all the video data applied through the switch 44 to the remote station, the communication control 46 disconnects the line. The remote station, when informed of the transmission of the video data associated with the video signals continuous in the direction B by the pretransmission procedure, decodes the incoming video data by a decoder back to the original video signals and, then, transfers them to a printer to record the images. On the other hand, if the supplied information represents the longitudinal direction A, the receiving station processes the incoming video data back to the original video signals and, then, stores one page of the video signals in a page memory. Thereafter, the data in the page memory are sequentially read out in a direction corresponding to the widthwise direction B of the document and fed one line by line to the printer to be recorded.

In the above-described manner, the facsimile apparatus in the illustrative embodiment transmits video data which is higher in compression ratio than the other, thereby saving time necessary for data transmission.

While the carriages 12 and 18 have been shown and described as constituting 1-magnification scanners, they may be of the type moving a light source and mirror assembly as in an imaging assembly of a copier or the like. In such an alternative case, the sensors will be located in suitable positions outside the associated carriages.

Figure 3:
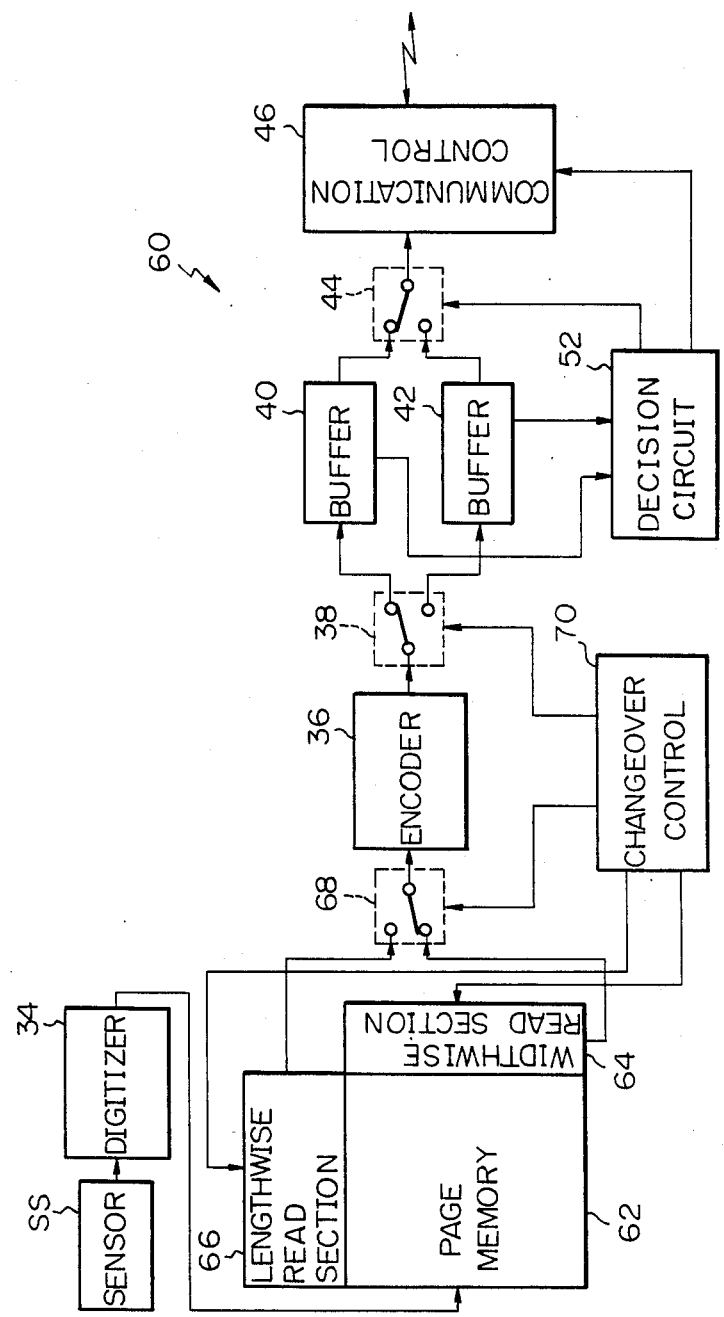
FIG. 3 is a block diagram of a signal processing and control system in accordance with another embodiment of the present invention.

Referring to FIG. 3, another embodiment of the present invention with a signal processing and control system 60 is shown. In FIG. 3, the same or similar structural elements as those of FIG. 2 are designated by like reference numerals. In this particular embodiment, a single sensor SS is used for reading a document as in prior art apparatuses. The output signal of the sensor SS is digitized by the digitizer 34, then stored in a page memory 62, and then read thereoutof either by a widthwise read section 64 for sequentially reading data in a direction corresponding to the widthwise direction B of the document or by a lengthwise read section 66 for sequentially reading data in a direction corresponding to the lengthwise direction A. A switch 68 is adapted to selectively apply the output signals of the read sections 64 and 66 to the encoder 36.

A changeover control 70 first positions both the switches 68 and 38 as illustrated and, then, enables the widthwise read section 64 to read the data out of the page memory 62. As a result, a video signal selected to continue in the widthwise direction B is encoded and stored in the buffer 40. After all the data have been read out by the read section 64 and transferred to the buffer 40, the changeover control 70 shifts both the switches 68 and 38 to positions opposite to the illustrated and, then, enables the lengthwise read section 66 to read the data out of the page memory 62. Consequently, a video signal continuous in the lengthwise direction A is encoded and stored in the buffer 42. This is followed by a procedure which has been described in relation with the first embodiment and, therefore, will not be described for simplicity.

As appreciated from the above, the second embodiment of the present invention achieves an advantage that it may be implemented even by a prior art apparatus (facsimile apparatus with a page memory), in addition to the advantage attainable with the first embodiment.

Although the foregoing embodiments have concentrated to selection of video signals with respect to the lengthwise and widthwise directions of a document only, the diagonal direction may be taken into consideration as well.

In summary, it will be seen that the present invention provides a facsimile apparatus which transmits video data in a selected high compression ratio so as to shorten a time necessary for transmission of video data and, thereby, enhance cost-effective transmission.

Various modifications will become possible for those skilled in the art after receiving the teachings of the present disclosure without departing from the scope thereof.

What is claimed is:

1. A facsimile apparatus comprising:
   video signal selector means for sequentially selecting, with respect to at least two different directions on a document, video signals produced by scanning said document and digitizing the signals produced thereby;
   encoder means for encoding the digitized video signals output from said video signal selector means;
   at least two buffer memory means for individually storing the encoded signals output from said encoder means while holding the encoded signals each in correspondence with one of the different directions;
   decision means for producing a decision signal by determining which one of the buffer memory means stores the smallest number of encoded signals;
   memory selector means for selecting one of the buffer memory means in response to the decision signal output from said decision means and delivering the video data stored in said selected buffer memory means; and
   a communication control unit for informing a facsimile apparatus at a remote station of a particular direction with which the video signals are associated before transmitting the video data which are output from said memory selector means.

2. A facsimile apparatus as claimed in claim 1, wherein the two directions on the document comprise a lengthwise direction and a widthwise direction of the document.

3. A facsimile apparatus as claimed in claim 1, wherein the video signal selector means comprises scanning means for scanning images on the document in the two directions to produce the individual video signals, switch means for sequentially and selectively switching the pixel signals, and digitizer means for digitizing the pixel signals from the selector means.

4. A facsimile apparatus as claimed in claim 3, further comprising scanning means control means for drivably controlling the scanning means, and scanning direction changeover control section for switchingly controlling the switch means and controlling said scanning means control means.

5. A facsimile apparatus as claimed in claim 1, wherein the video signal selector means comprises scanning means for scanning images on the document in one of the two directions to produce the pixel signal, digitizer means for digitizing the pixel signal from said scanning means, memory means for storing the digitized signal output from said digitizer means and provided with two read sections which are associated each with one of the two directions, and switch means for sequentially and selectively switching said read portions.

6. A facsimile apparatus as claimed in claim 5, further comprising changeover control means for controlling reading of the digital signals out of the read sections and switchingly controlling the switch means.

* * * * *